US 9,054,585 B2

(12) United States Patent
Amrutur et al.

(10) Patent No.: US 9,054,585 B2
(45) Date of Patent: Jun. 9, 2015

(54) LOW DROP DIODE EQUIVALENT CIRCUIT

(71) Applicants: Department of Electronics and Information Technology, New Delhi (IN); Indian Institute of Science, Bangalore (IN)

(72) Inventors: Bharadwaj Amrutur, Bangalore (IN); Laxmi Karthikeyan, Bangalore (IN)

(73) Assignees: Department of Electronics and Information Technology, New Delhi (IN); Indian Institute of Science, Bangalore (IN)

( * ) Notice: Subject to any disclaimer, the term of this patent is extended or adjusted under 35 U.S.C. 154(b) by 121 days.

(21) Appl. No.: 13/790,075

(22) Filed: Mar. 8, 2013

(65) Prior Publication Data

US 2014/0126260 A1    May 8, 2014

(30) Foreign Application Priority Data

Nov. 6, 2012    (IN) .......................... 4639/CHE/2012

(51) Int. Cl.
| | |
|---|---|
| *H03K 17/687* | (2006.01) |
| *H02M 7/217* | (2006.01) |
| *H02M 7/219* | (2006.01) |

(52) U.S. Cl.
CPC ...... *H02M 7/217* (2013.01); *H02M 2007/2195* (2013.01); *Y02B 70/1408* (2013.01)

(58) Field of Classification Search
CPC ......... H03K 3/02; H03K 3/315; H03K 17/06; H03K 17/082; H03K 17/0822; H03K 17/0826; H03K 17/0828; H03K 17/0812; H03K 17/08122; H03K 17/08126; H03K 17/08128; H03K 2217/0036; H03K 2217/0045
USPC ................. 327/420–421, 423–427, 502–504
See application file for complete search history.

(56) References Cited

U.S. PATENT DOCUMENTS

| | | | | |
|---|---|---|---|---|
| 4,590,395 | A * | 5/1986 | O'Connor et al. ............ 327/374 |
| 6,501,673 | B2 * | 12/2002 | Lisi et al. ................. 365/185.21 |
| 2013/0113687 | A1 * | 5/2013 | Lin et al. ........................ 345/76 |

OTHER PUBLICATIONS

Abdelaziz et al., A Low Start up Voltage Charge Pump for Thermoelectric Energy Scavenging, IEEE International Symposium on Industrial Electronics (ISIE), 2011, pp. 71-75.
Beeby et al., A micro electromagnetic generator for vibration energy harvesting, Journal of Micromechanics and Microengineering, Jun. 2007, pp. 1257-1265, vol. 17, No. 7.

(Continued)

*Primary Examiner* — An Luu
(74) *Attorney, Agent, or Firm* — The Webb Law Firm

(57) ABSTRACT

Embodiments of the disclosure relate to a low drop diode equivalent circuit. Piezoelectric device based vibration energy harvesting requires a rectifier for conversion of input ac to usable dc form. Power loss due to diode drop in rectifier is a significant fraction of the already low levels of harvested power. The low-drop-diode equivalent can replace the rectifier diodes and minimize power loss. The diode equivalent mimics a diode using linear region operated MOSFET. The diode equivalent is powered directly from input signal and requires no additional power supply for its control. Power used by the control circuit is kept at a value which gives an overall output power improvement. The diode equivalent replaces the four diodes in a full wave bridge rectifier, which is the basic full-wave rectifier and is a part of the more advanced rectifiers like switch-only and bias-flip rectifiers.

13 Claims, 12 Drawing Sheets

(56) References Cited

OTHER PUBLICATIONS

Ben-Yaakov et al., Resonant Rectifier for Piezoelectric Sources, IEEE Applied Power Electronics Conference and Exposition (APEC), 2005, pp. 249-253, vol. 1.

Chandrakasan et al., Next Generation Micro-power Systems, IEEE Symposium on VLSI Circuits Digest of Technical Papers, Jun. 2008, pp. 2-5.

Chen et al., Self-powered Piezoelectric Energy Harvesting Device using Velocity control Synchronized Switching Technique, IEEE Proc. 36th Annual Conference on Industrial Electronics Safety, 2010, pp. 1785-1790.

Cheng et al., A Voltage-Multiplying Self-Powered AC/DC Converter with 0.35-V Minimum Input Voltage for Energy Harvesting Applications, IEEE Transactions on Power Electronics, Sep. 2011, pp. 2542-2549, vol. 26, No. 9.

Dallago et al., Active Self Supplied AC-DC Converter for Piezoelectric Energy Scavenging Systems With Supply Independent Bias, IEEE Proc. Int. Symp. Circuits and Systems, May 2008, pp. 1448-1451.

Garbuio et al., Mechanical Energy Harvester With Ultralow Threshold Rectification Based on SSHI Nonlinear Technique, IEEE Transactions on Industrial Electronics, Apr. 2009, pp. 1048-1056, vol. 56, No. 4.

Guilar et al., A Full-Wave Rectifier for Interfacing with Multi-Phase Piezoelectric Energy Harvesters, IEEE International Solid-State Circuits Conference Digest of Technical Papers, 2008, pp. 302-615.

Guo et al., An Efficiency-Enhanced CMOS Rectifier With Unbalanced-Biased Comparators for Transcutaneous-Powered High-Current Implants, IEEE Journal of Solid-State Circuits, Jun. 2009, pp. 1796-1804, vol. 44, No. 6.

Lallart et al., An optimized self-powered switching circuit for non-linear energy harvesting with low voltage output, Smart Materials and Structures, 2008, pp. 1-8, vol. 17, No. 3.

Le et al., Piezoelectric Micro-Power Generation Interface Circuits, IEEE Journal of Solid-State Circuits, Jun. 2006, pp. 1411-1420, vol. 41, No. 6.

Lefeuvre et al., A comparison between several vibration-powered piezoelectric generators for standalone systems, Sensors and Actuators A, Feb. 2006, pp. 405-416, vol. 126, Issue 2.

Lim et al., A Smart-Power Synchronous Rectifier by CMOS Process, IEEE Transactions on Power Electronics, Sep. 2010, pp. 2469-2477, vol. 25, No. 9.

Makihara et al., Low energy dissipation electric circuit for energy harvesting, Smart Materials and Structures, Sep. 2006, pp. 1493-1498, vol. 15, Issue 5.

Man et al., A 0.9-V Input Discontinuous-Conduction-Mode Boost Converter With CMOS-Control Rectifier, IEEE Journal of Solid-State Circuits, Sep. 2008, pp. 2036-2046, vol. 43, No. 9.

Man et al., A CMOS-Control Rectifier for Discontinuous-Conduction Mode Switching DC-DC Converters, IEEE International Solid-State Circuits Conference Digest of Technical Papers, Feb. 2006, pp. 1408-1417.

Marzencki et al., Integrated power harvesting system including a MEMS generator and a power management circuit, Sensors and Actuators A, Jul.-Aug. 2008, pp. 363-370, vol. 145-146.

Nakamoto et al., A Passive UHF RFID Tag LSI with 36.6% Efficiency CMOS-Only Rectifier and Current-Mode Demodulator in 0.35 μm FeRAM Technology, IEEE International Solid-State Circuits Conference Digest of Technical Papers, 2006, pp. 1201-1210.

Okamoto et al., A Concept of an Electret Power Generator Integrated With A Rectifier, PowerMEMS, 2009, Washington DC, USA, Dec. 1-4, 2009, pp. 292-295.

Peters et al., A CMOS integrated voltage and power efficient AC/DC converter for energy harvesting applications, Journal of Micromechanics and Microengineering, Sep. 2008, pp. 1-9, vol. 18, No. 10.

Rahimi et al., A vibration-based electromagnetic energy harvester system with highly efficient interface electronics, Solid-State Sensors, Actuators and Microsystems Conference (Transducers), 2011, pp. 2650-2653.

Ramadass et al., An Efficient Piezoelectric Energy Harvesting Interface Circuit Using a Bias-Flip Rectifier and Shared Inductor, IEEE Journal of Solid-State Circuits, Jan. 2010, pp. 189-204, vol. 45, No. 1.

Rao et al., An Input-Powered Vibrational Energy Harvesting Interface Circuit with Zero Standby Power, IEEE Transactions on Power Electronics, Dec. 2011, pp. 3524-3533, vol. 26, No. 12.

Sun et al., An Comparator Based Active Rectifier for Vibration Energy Harvesting Systems, Proc. 13th International Conference on Advanced Communication Technology (ICACT), 2011, pp. 1404-1408.

Szarka et al., Review of Power Conditioning for Kinetic Energy Harvesting Systems, IEEE Transactions on Power Electronics, Feb. 2012, pp. 803-815, vol. 27, No. 2.

Tan et al., Maximize Piezoelectric Energy Harvesting Using Synchronous Charge Extraction Technique For Powering Autonomous Wireless Transmitter, Proc. IEEE International Conference on Sustainable Energy Technologies (ICSET), 2008, pp. 1123-1128.

Tan et al., Optimized Wind Energy Harvesting System Using Resistance Emulator and Active Rectifier for Wireless Sensor Nodes, IEEE Transactions on Power Electronics, Jan. 2011, pp. 38-50, vol. 26, No. 1.

Xu et al., Low Frequency Pulsed Resonant Converter for Energy Harvesting, IEEE Transactions on Power Electronics, Jan. 2007, pp. 63-68, vol. 22, No. 1.

* cited by examiner (a) PZD output (b) FBR-filter output

LOW DROP DIODE EQUIVALENT CIRCUIT

TECHNICAL FIELD

Embodiments of the present disclosure relates to diode equivalent circuits. More particularly, the embodiments relate to a low drop diode equivalent circuit.

BACKGROUND

Presently, ambient vibration energy can be harvested and converted to useful electrical energy. The electrical energy can be used for powering low-power electronic systems such as sensors, MEMS devices or implantable medical electronics. Vibration energy can be harvested using various types of transducers like electromagnetic, electrostatic or piezoelectric. Electromagnetic device based harvesters employ a coil to tap energy from a moving magnetic field produced by magnets, which move in the ambient vibration. In electrostatic energy transducers, vibration leads to a relative parallel motion between an electret and nearby metallic surface. This leads to induced counter charge on the metal, with the charge simply following the relative motion of the electrets. This produces an electric current. Piezoelectric harvesters work by stressing a piezoelectric material in accordance with the vibration and tapping the generated electric charge from the material.

The electrical energy from any vibration energy harvester device is converted to a load usable form by an interface circuit, which is connected between the device and its load. The interface circuit consists of a rectifier-filter section for conversion of input ac to dc. The diodes in the rectifier conduct with a voltage drop, leading to power loss. The power loss due to diode-drop is a significant fraction of the overall harvested power which is in the range of 10-100 $\mu W$. It is therefore required for the diodes to conduct with minimum voltage drop.

There is the need of a diode equivalent circuit, which has a very low forward conduction drop, blocks any reverse conduction, can be used as a standalone diode able to replace the four diodes in full wave bridge rectifier (FBR), does not use an additional external power supply and is powered directly from input signal and not from harvested power, so as to use the available input power instead of the extracted output power and so that it consumes no standby power. Also, the diode equivalent should not demand additional off-chip components and the control circuit used should draw minimum power.

Conventional techniques have used synchronous rectifiers. A synchronous rectifier is a MOSFET which is controlled such that it conducts in the deep triode region in one direction and goes into sub threshold region i.e. OFF state in the other direction. Many of these synchronous rectifiers require an external power supply or a second piezoelectric patch for powering up a comparator, while one of the existing techniques to reduce diode drop requires an additional phase-shifted input for full wave rectification. The prior art passive full wave implementations and passive standalone diodes provide low diode drop without the use of external power supply. However, a few of these require additional off-chip capacitors and most of these are less power efficient due to transistors operating in saturation region instead of the cut off region and the consequent reverse conduction or due to continuous conduction of control circuit components such as diodes and resistors. A MOSFET based full wave rectifier followed by a diode is a prior art initiative to block reverse conduction. This technique and other passive rectifier implementations have used the output power instead of the input power, to power its comparator and other control circuit elements. This leads to consumption of standby power. The issue has been taken care of, in another known prior art with an input powered full wave rectifier and active diode. However, this technique and the prior art gate cross-coupled topologies of MOSFET based full wave bridge rectifier, are specific circuits for full wave bridge rectifier and do not come to use as a standalone low drop diode. Also, a few prior art passive half and full wave rectifier techniques with reduced diode drop do not fit in to be used in a full wave bridge rectifier.

Hence, there is the need of a solution for a low drop diode which can overcome the disadvantages of the existing methods and meet the requirements of being an energy efficient, signal powered and standalone diode capable of replacing any rectifier diode. Further, the solution should use minimal external hardware.

REFERENCES

[1] S. P. Beeby et al., "A micro electromagnetic generator for vibration energy harvesting", J. Micromechanics & Microengineering, vol. 17, no. 7, pp. 1257-1265, June 2007.

[2] H. Okamoto, T. Suzuki, K. Mori, and H. Kuwano, "A Concept of an Electret Power Generator Integrated With A Rectifier", PowerMEMS 2009, Washington D.C., USA, Dec. 1-4 2009.

[3] Yogesh K. Ramadass, and Anantha P. Chandrakasan, "An Efficient Piezoelectric Energy Harvesting Interface Circuit Using a Bias-Flip Rectifier and Shared Inductor," IEEE J. Solid-State Circuits, vol. 45, no. 1, pp. 189-204, January 2010.

[4] A. Chandrakasan, D. Daly, J. Kwong, and Y. Ramadass, "Next generation micro-power systems," in Symp. VLSI Circuits Dig., June 2008, pp. 2-5.

[5] Szarka, G.; Stark, B.; Burrow, S., "Review of Power Conditioning for Kinetic Energy Harvesting Systems", IEEE Trans. Power Electronics, 2011, ISSN: 0885-8993, Digital Object Identifier: 10.1109/TPEL.2011.2161675.

[6] T. Y. Man, P. K. T. Mok, and M. Chan, "A CMOS-Control Rectifier for Discontinuous-Conduction Mode Switching DC-DC Converters," in IEEE Int. Solid-State Circuits Conf. Dig. Tech. Papers, February 2006, pp. 1408-1417.

[7] Tsz Yin Man, Philip K. T. Mok, and Mansun J. Chan, "A 0.9-V Input Discontinuous-Conduction-Mode Boost Converter With CMOS-Control Rectifier," IEEE J. Solid-State Circuits, vol. 43, no. 9, pp. 2036-2046, September 2008.

[8] T. Le, J. Han, A. von Jouanne, K. Mayaram, and T. Fiez, "Piezoelectric micro-power generation interface circuits," IEEE J. Solid-State Circuits, vol. 41, no. 6, pp. 1411-1420, June 2006.

[9] Yu-Yin Chen, Dejan Vasic, Francois Costa, Wen-Jong Wu, C. K. Lee, "Self-powered Piezoelectric Energy Harvesting Device using Velocity control Synchronized Switching Technique," in Proc. 36th Annual Conference on IEEE Industrail Electronics Safety, 2010, pp. 1785-1790.

[10] Nathaniel J. Guilar, Rajeevan Amirtharajah, and Paul J. Hurst, "A Full-Wave Rectifier for Interfacing with Multi-Phase Piezoelectric Energy Harvesters," in IEEE Int. Solid-State Circuits Conf. Dig. Tech. Papers, 2008, pp. 302-615.

[11] Marcin Marzencki, Yasser Ammar, Skandar Basrour, "Integrated power harvesting system including a MEMS generator and a power management circuit", Sensors and Actuators A: Physical, Vol. 145-146, pp. 363-370, July-August 2008.

[12] Abdelaziz, S.; Emira, A.; Radwan, A. G.; Mohieldin, A. N.; Soliman, A. M., "A low start up voltage charge pump for thermoelectric energy scavenging", IEEE International Symposium on Industrial Electronics (ISIS), 2011, pp. 71-75.

[13] Shuo Cheng; Sathe, R.; Natarajan, R.; Arnold, D. P.; "A Voltage-Multiplying Self-Powered AC/DC Converter with 0.35-V Minimum Input Voltage for Energy Harvesting Applications", IEEE trans. Power Electronics, vol. 26, issue 9, pp. 2542-2549, March 2011

[14] Yen Kheng Tan, and Sanjib Kumar Panda, "Optimized Wind Energy Harvesting System Using Resistance Emulator and Active Rectifier for Wireless Sensor Nodes", IEEE trans. Power Electronics, vol. 26, no. 1, pp. 38-50, January 2011.

[15] Christian Peters, Dirk Spreemann, Maurits Ortmanns and Yiannos Manoli, "A CMOS integrated voltage and power efficient AC/DC converter for energy harvesting applications", J. Micromechanics & Microengineering, vol. 18, no. 10, September 2008.

[16] Rao, Y.; Arnold, D.; "An Input-Powered Vibrational Energy Harvesting Interface Circuit with Zero Standby Power", IEEE trans. Power Electronics, vol. 26, no. 12, pp. 3524-3533, December 2011.

[17] Chow Yee Lim, Yung C. Liang, Ganesh S. Samudra, and N. Balasubramanian, "A Smart-Power Synchronous Rectifier by CMOS Process," IEEE Trans. Power Electronics, vol. 25, no. 9, pp. 2469-2477, September 2010.

[18] Song Guo, and Hoi Lee, "An Efficiency-Enhanced CMOS Rectifier With Unbalanced-Biased Comparators for Transcutaneous-Powered High-Current Implants," IEEE J. Solid-State Circuits, vol. 44, no. 6, pp. 1796-1804, June 2009.

[19] Yang Sun, In-young Lee, Chang-jin Jeong, Seok-kyun Han, and Sang-gug Lee, "An Comparator Based Active Rectifier for Vibration Energy Harvesting Systems," in Proc. 13th International Conference on Advanced Communication Technology (ICACT), 2011, pp. 1404-1408.

[20] E. Lefeuvre, A. Badel, C. Richard, L. Petit, and D. Guyomar, "A comparison between several vibration-powered piezoelectric generators for standalone systems," ELSEVIER: Sensors and Actuators A, vol. 126, issue 2, pp. 405-416, February 2006.

[21] M. Lallart and D. Guyomar, "An optimized self-powered switching circuit for non-linear energy harvesting with low voltage output," Smart Materials and Structures, vol. 17, no. 3, pp. 1-8, 2008.

[22] Y. K. Tan, J. Y. Lee, and S. K. Panda, "Maximize Piezoelectric Energy Harvesting Using Synchronous Charge Extraction Technique For Powering Autonomous Wireless Transmitter," in Proc. IEEE International Conference on Sustainable Energy Technologies (ICSET), 2008, pp. 1123-1128.

[23] Ben-Yaakov, S., Krihely, N., "Resonant rectifier for piezoelectric sources, Applied Power Electronics Conference and Exposition (APEC), 2005, vol. 1, pp. 249-253.

[24] Xu, S.; Ngo, K. D. T.; Nishida, T.; Chung, G.-B.; Sharma, A., "Low Frequency Pulsed Resonant Converter for Energy Harvesting, IEEE trans. Power Electronics, vol. 22, issue 1, pp. 63 68, January 2007.

[25] Kanjuro Makihara, Junjiro Onoda and Takeya Miyakawa, "Low energy dissipation electric circuit for energy harvesting", Smart Materials and Structures, vol. 15, issue 5, pp. 1493-1498, September 2006.

[26] Laurie Garbuio, Mickal Lallart, Daniel Guyomar, Claude Richard, and David Audigier, "Mechanical Energy Harvester With Ultralow Threshold Rectification Based on SSHI Nonlinear Technique", IEEE trans. Industrial Electronics, vol. 56, no. 4, pp. 1048-1056, April 2009

[27] Hiroyuki Nakamoto, Daisuke Yamazaki, Takuji Yamamoto, Hajime Kurata, Satoshi Yamada, Kenji Mukaida, Tsuzumi Ninomiya, Takashi Ohkawa, Shoichi Masui, and Kunihiko Gotoh, "A Passive UHF RFID Tag LSI with 36.6% Efficiency CMOS-Only Rectifier and Current-Mode Demodulator in 0.35 μm FeRAM Technology," in IEEE Int. Solid-State Circuits Conf. Dig. Tech. Papers, 2006, pp. 1201-1210.

[28] E. Dallago, D. Miatton, G. Venchi, V. Bottarel, G. Frattini, G. Ricotti and M. Schipani, "Active self-supplied AC-DC converter for piezoelectric energy scavenging systems with supply independent bias," in Proc. Int. Symp. Circuits and Systems, May 2008, pp. 1448-1451.

[29] Rahimi, A.; Zorlu, O.; Muhtaroglu, A.; Kulah, H., "A vibration-based electromagnetic energy harvester system with highly efficient interface electronics", Solid-State Sensors, Actuators and Microsystems Conference (Transducers), 2011, pp. 2650 2653.

SUMMARY

The shortcomings of the prior art are overcome and additional advantages are provided through the provision of methods and systems of the present disclosure.

The present disclosure solves limitations of existing techniques by providing a low drop diode equivalent (LDDE) circuit which conducts in the forward direction with minimum voltage drop, blocks any reverse conduction, is standalone and able to replace the diodes in any rectifier including full wave bridge rectifier, do not use an additional external power supply, is powered directly from input signal and not from harvested power, does not demand off-chip components and draws minimum power for the control circuit.

Additional features and advantages are realized through various techniques provided in the present disclosure. Other embodiments and aspects of the disclosure are described in detail herein and are considered as part of the claimed disclosure.

In one embodiment, the disclosure provides a low drop diode equivalent circuit, input is the source terminal of a metal oxide semiconductor field effect transistor (MOSFET) ($M_1$—hereafter referred to as the switch MOSFET), output is the drain terminal of $M_1$ and the gate terminal of $M_1$ is provided a control signal, said input is also being coupled to emitter terminal of a Bipolar Junction Transistor (BJT) ($T_1$—hereafter referred to as the sense BJT), base terminal of said sense transistor is coupled to the output, collector terminal of said sense transistor is connected to base terminal of a control BJT ($T_2$), collector terminal of said control BJT is connected to gate terminal of switch transistor ($M_1$) to control $M_1$, emitter of $T_2$ is referred to as the control reference (C), a discharge MOSFET ($M_2$) is connected across the drain terminal and the gate terminal of the switch transistor ($M_1$), gate terminal of discharge MOSFET ($M_2$) is connected to a reverse sense signal (R) which senses the reversal of input signal. For a PMOS based low drop diode equivalent circuit, anode of equivalent diode is the source of switch MOSFET and cathode is the drain of the switch MOSFET. Alternatively, for an NMOS based low drop diode equivalent, anode of equivalent diode is the drain of the switch MOSFET and cathode is the source of switch MOSFET.

In one embodiment, the disclosure provides a current reversal sense circuit (CRSC). The CRSC input is connected to cathode of first diode ($D_1$) and anode of second diode ($D_2$), the anode of $D_1$ and cathode of $D_2$ are connected to each other and the first terminal of a capacitor ($C_s$), output is connected to anode of third diode ($D_3$) and cathode of fourth diode ($D_4$), the cathode of $D_3$ and anode of $D_4$ are connected to each other and the second terminal of capacitor ($C_s$).

In another embodiment, the disclosure provides a full-wave bridge rectifier for rectifying the electrical ac input from a piezoelectric device based vibration energy harvester. To reduce the forward conduction drop of the diodes in the full-wave bridge rectifier, all the four diodes in the full-wave bridge rectifier are replaced with low drop diode equivalents, by connecting the input of current reversal sense circuit (CRSC) to the first terminal of piezoelectric device and the output of CRSC to the second terminal of piezoelectric device, by connecting the cathodes of 2 numbers of PMOS-based diode equivalents ($DM_1$ and $DM_2$), to the first terminal of output filter capacitor ($C_o$), by connecting the anodes of 2 numbers of NMOS-based diode equivalents ($DM_3$ and $DM_4$) to the second terminal of output filter capacitor ($C_o$), by connecting the anode of $DM_1$ and cathode of $DM_3$ to the input of CRSC, by connecting the anode of $DM_2$ and cathode of $DM_4$ to the output of CRSC, by connecting the first terminal of capacitor (Cs) of CRSC as reverse signal (R) of $DM_1$ and $DM_3$, by connecting the second terminal of capacitor (Cs) of CRSC as reverse signal (R) of $DM_2$ and $DM_4$, by connecting the control reference (C) of $DM_1$ and $DM_3$ to the output of CRSC and by connecting the control reference (C) of $DM_2$ and $DM_4$ to the input of CRSC.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The embodiments of the disclosure itself, however, as well as a preferred mode of use, further objectives and advantages thereof, will best be understood by reference to the following detailed description of an illustrative embodiment when read in conjunction with the accompanying drawings. One or more embodiments are now described, by way of example only, with reference to the accompanying drawings wherein like reference numerals represent like elements and in which:

Figure 1:
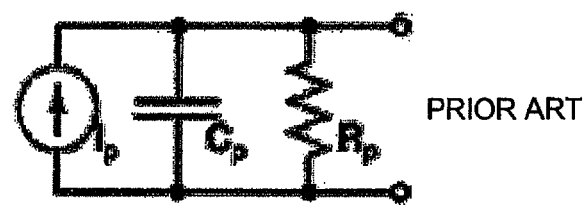
FIG. 1 shows a prior art of an equivalent circuit of a piezoelectric device (PZD) at resonance.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

One embodiment of the disclosure provides piezoelectric device based vibration energy harvesting which requires a rectifier for conversion of input ac to usable dc form. Power loss due to diode drop in rectifier is a significant fraction of the already low levels of harvested power. To reduce the diode drop, the circuit is a low-drop-diode equivalent, which mimics a diode using linear region-operated MOSFET. The diode equivalent is powered directly from input signal and requires no additional power supply for its control. The power used by the control circuit is kept at a bare minimum to have an overall output power improvement. The diode equivalent can be used to replace the four diodes in a full wave bridge rectifier (FBR), which is the most common rectifier reported in the energy harvesting literature, sometimes referred to as the standard and is a part of the more advanced rectifiers like switch-only and bias-flip rectifiers.

One embodiment of the present disclosure is a low-drop-diode equivalent (LDDE). The LDDE is based on mimicking a low drop diode with a MOSFET operated in linear region. The MOSFET is controlled to work as a synchronous rectifier such that it conducts in the deep triode region in one direction and goes into sub-threshold region i.e. OFF state in the other direction. Also, the LDDE meets all of the requirements mentioned in the background.

The efficacy of the LDDE has been proved in a piezoelectric device (PZD) based vibration energy harvesting system. The electrical equivalent of a PZD when it is vibrated at its resonance frequency is shown in FIG. 1. $I_p$ is a sinusoidal current source with amplitude equal to the current $Ip_{peak}$. The current $Ip_{peak}$ depends on the amplitude of vibration and the frequency $f_p$ of the current source is equal to the frequency of vibration. Resonant frequency of the PZD is assumed to match with $f_p$. From FIG. 1, the maximum available power from the PZD with conjugate matching of load is given by $$P_{PZD_{(max)}} = \frac{I_{p_{peak}}^2 \times R_p}{B} \quad (1)$$

In one embodiment, when the rectifier-filter section is introduced at the output of PZD, it sets a further limit on the maximum available power to the load. Let the limit on the maximum available or extractable power be represented by $P_{EXT_{(max)}}$. Then, $P_{EXT_{(max)}} \leq P_{PZD_{(max)}}$. The $P_{EXT_{(max)}}$ is dependent on the architecture of rectifier. Table I provides the $P_{EXT_{(max)}}$ for different architectures. As shown in Table I, for all rectifier architectures, $P_{EXT_{(max)}}$ increases as the rectifier diode drop decreases.

TABLE I shows $P_{EXT_{(max)}}$ of various rectifier architectures.

| Rectifier Architecture | $P_{EXT_{(max)}}$ |
| --- | --- |
| FBR | $C_p \cdot (V_p - 2V_D)^2 \cdot f_p$ |
| Voltage Doubler | $C_p \cdot (V_p - V_D)^2 \cdot f_p$ |
| Switch Only Rectifier | $2 \cdot C_p \cdot (V_p - V_D)^2 \cdot f_p$ |
| Bias Flip Rectifier | $2 \cdot C_p \cdot \left(V_p - \dfrac{V_D}{Q}\right)^2 \cdot Q \cdot f_p$ |

$V_p$ is the open circuit voltage amplitude at the output of PZD.
$V_D$ is the rectifier diode drop.
$R_p$ is ignored in the derivation of $P_{EXT_{(max)}}$ of the first 3 rectifiers.
Q is qualitatively the parallel combination of the Q-factors of PZD and that of the resonant path of $C_p$ and inductor of bias-flip rectifier.

A MOSFET operated in linear region i.e. deep triode region exhibits a very low value of dc resistance. The MOSFET can conduct with lesser voltage drop for the same current, as compared to a diode or a diode-connected MOSFET (DCMOS). This property of MOSFET is utilised to obtain a low drop diode equivalent. Also, a DCMOS cannot be used as a low-drop diode, because of a minimum drop across it which is equal to the threshold voltage of MOSFET.

Figure 2:
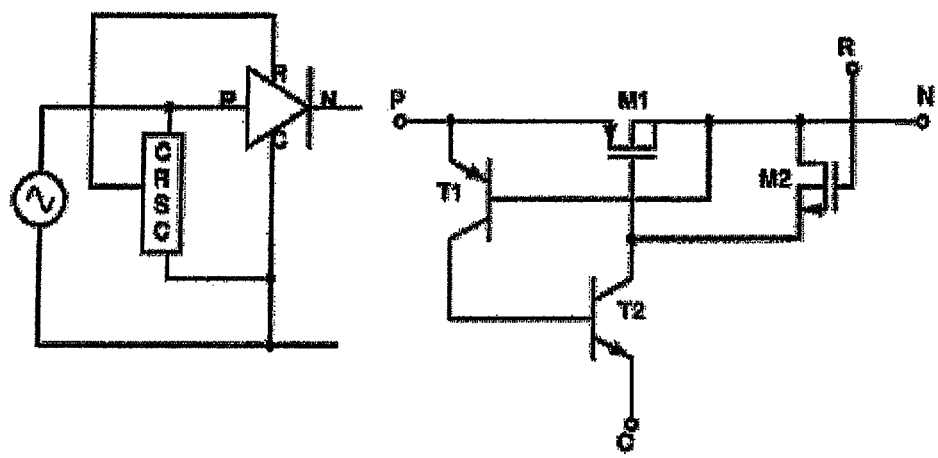
FIG. 2 shows a schematic circuit diagram of the PMOS based low drop diode equivalent (LDDE), in accordance with one embodiment.

One embodiment of the present disclosure is a low-drop-diode equivalent (LDDE). A MOSFET is controlled such that it conducts only in one direction i.e. forward direction and in linear region in the forward direction. The control circuit draws power directly from the input signal, so that no external supply is required. The circuit diagram of the LDDE is shown in FIG. 2, in which source of PMOS ($M_1$) acts as anode and drain of $M_1$ acts as the cathode of LDDE. The emitter base junction of p-n-p transistor ($T_1$) is across i.e. in parallel with the source drain of $M_1$. The substrate of $M_1$ is kept connected to drain to block reverse conduction.

One embodiment illustrates the LDDE operation. When the LDDE is applied with a voltage in the forward direction i.e. with positive voltage signal, the emitter-base junction of $T_1$ is forward biased and $T_1$ begins to conduct. Thereafter, when $T_1$ conducts, it provides the base drive current to n-p-n BJT ($T_2$) and $T_2$ enters into conduction. The gate source capacitance Cgs of $M_1$ gets connected across the PZD through $T_2$ and capacitor Cgs starts getting charged in the negative direction. When the source gate voltage $V_{sg}$ of $M_1$ exceeds the threshold voltage of $M_1$, $M_1$ starts conducting. The capacitor Cgs of $M_1$ continues to get charged and $V_{sg}$ of $M_1$ keeps increasing. As the voltage $V_{sg}$ keeps increasing, $M_1$ enters from the saturation region into linear region. Thereafter, the source drain voltage of $M_1$ ($V_{sd}$) reduces to a very low value. Since the voltage across emitter base junction of $T_1$ reduces, $T_1$ turns OFF, thereby $T_2$ turns OFF.

The capacitor Cgs of $M_1$ stops getting charged. However, the capacitor $C_{gs}$ has no path to discharge and $V_{sg}$ is maintained, which enables $M_1$ to continue conducting in the linear region. After $M_1$ starts conducting in the linear region, the drop across the parallel combination of $M_1$ source-drain and $T_1$ emitter-base junction is dictated by the linear region characteristic of $M_1$. The drop across anode and cathode of the LDDE thus becomes equal to that across a MOSFET in linear region. When signal reverses, signal R gets activated. The signal R is a one-diode drop positive signal with respect to cathode of LDDE or anode of LDDE, cathode and anode being at almost the same potential. The signal R turns ON the NMOS ($M_2$), which discharges $C_{dg}$ of $M_1$ and turns $M_1$ OFF to prevent reverse conduction.

Figure 3:
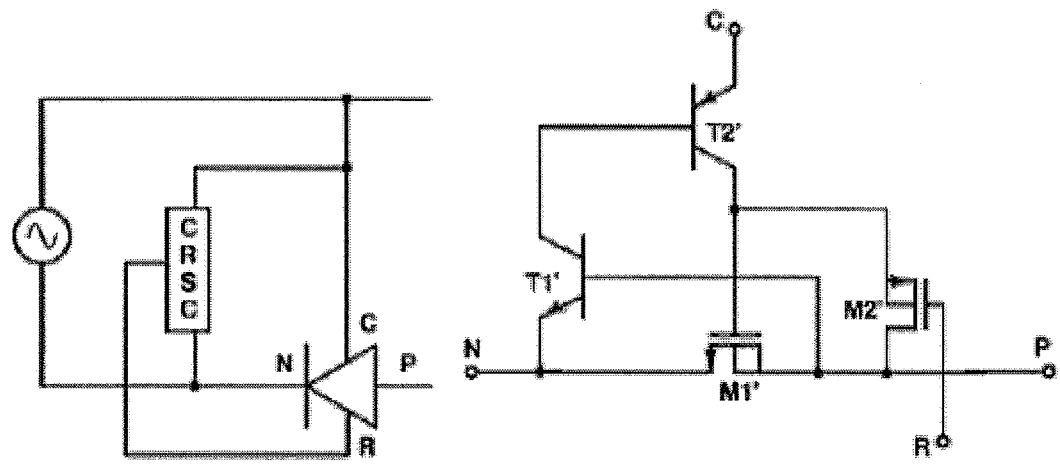
FIG. 3 shows an NMOS-based LDDE, in accordance with an alternate embodiment.

FIG. 3 shows NMOS-based implementation of LDDE, in accordance with an alternate embodiment of the present disclosure. It is the complementary counterpart of PMOS-based LDDE in FIG. 2.

Figure 4:
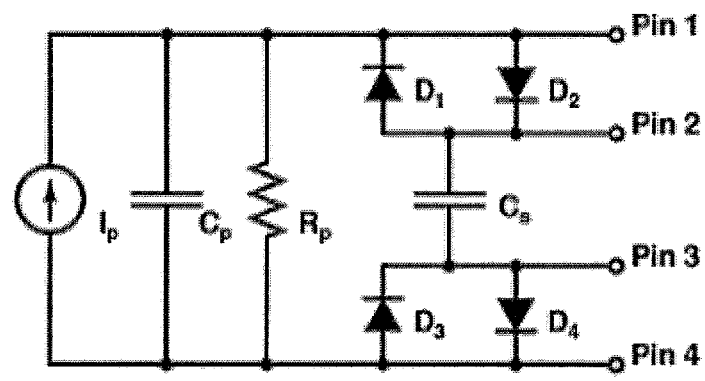
FIG. 4 shows a current reversal sense circuit (CRSC), in accordance with one embodiment.

One embodiment of the present disclosure is current reversal sense circuit (CRSC), as shown in the FIG. 4. The reversal of current is sensed using the current reversal sense circuit (CRSC) and fed as signal R. Diodes $D_1$, $D_2$, $D_3$, $D_4$ and capacitor $C_s$ form the CRSC. When current $I_p$ makes a zero-crossing from negative to positive value, current flows into Cs through the path $D_2$-Cs-$D_4$, which keeps diodes $D_2$ and $D_4$ forward biased during the transition of $I_p$ from negative to positive. The voltage at Pin 2 with respect to (w.r.t) Pin 1 is negative and the voltage at Pin 3 w.r.t. Pin 4 is positive. Similarly, during the zero-crossing of $I_p$ from positive to negative, the voltage at Pin 2 w.r.t. Pin 1 is positive and the voltage at Pin 3 w.r.t. Pin 4 is negative. Thus, the current Ip transition direction is indicated by either of voltage at Pin 2 w.r.t. Pin 1 or voltage at Pin 3 w.r.t. Pin 4.

At the resonant frequency $f_p$, the voltage across CRSC diode around zero-crossing is given by $$V_{D_{(CRSC)}} = \frac{i_p \times R_D}{1 + \dfrac{C_P}{C_S} + j\dfrac{2 \times R_D}{(2 \times \pi \times f_p \times C_p)^{-1}}} \quad (2)$$

where $R_D$ is the resistance of conducting diode, $i_p$ is the instantaneous value of $I_p$, and $R_p$ is ignored. From equation (2), if $$\frac{2 \times R_D}{(2\pi f_p \cdot C_p)^{-1}} \ll \frac{C_p}{C_s},$$

the zero crossing of $I_p$ is detected i.e. in the form of $V_{D(CRSC)}$ with minimum lag. Also, two resistors may be used instead of the four diodes. However, the diodes are used to limit the gate voltage of $M_2$ with respect to its source or drain voltage.

Figure 5:
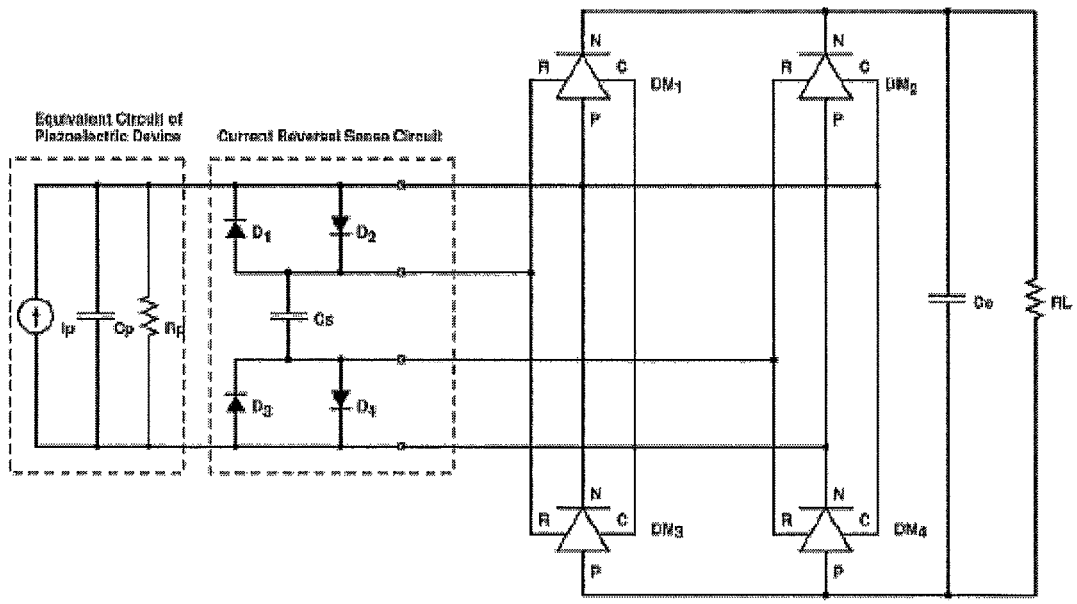
FIG. 5 shows a full-wave bridge rectifier (FBR) and filter for PZD using the LDDE, in accordance with one embodiment.

FIG. 5 shows a full wave bridge rectifier (FBR) with the LDDE, in accordance with an embodiment. As shown in the FIG. 5, $DM_1$ and $DM_2$ are PMOS-based implementations of diode. $DM_3$ and $DM_4$ are NMOS-based LDDE. Co is the filter capacitor and $R_L$ is the load resistor.

In one embodiment, the control circuit in LDDE does not need an external power supply. The power is drawn directly from PZD. The additional power consumption as compared to conventional DCMOS is by $T_1$ and the gate capacitance of $M_2$. $T_1$, however, conducts only for a short duration at the beginning of the conducting half cycle. Also, the current flowing through $T_1$ is very low as it is the base current of $T_2$. The gate capacitance of $M_2$ can be kept low by sizing $M_2$ to a low dimension, without drastically affecting the time taken to discharge $C_{dg}$ of $M_1$. So, the additional power consumption by the LDDE is very less. Also, the CRSC takes power directly from PZD and does not need an additional power supply. Power drawn by CRSC is negligible as the capacitance of $C_s$ is very small (about $\frac{1}{1000}$) as compared to $C_p$. As with any synchronous rectifier, the charging and discharging of gate capacitance (C) of $M_1$ consumes power. The higher the voltage V to which it is charged, the higher is the switching loss ($CV^2 f_p$). However, the equivalent diode drop decreases with increase in V.

In one embodiment, the usability of LDDE in other rectifier circuits is shown. The LDDE has two additional pins, "C" and "R" apart from the anode and cathode of an ordinary diode. When using a PMOS-based LDDE, the anode "P" and cathode "N" are connected as in the case of a normal diode. "C" is connected to a point in the circuit which, when the LDDE is conducting, would be at least one threshold voltage below the point to which anode "P" of LDDE is connected. "R" is generated by connecting the CRSC across "P" and "C" and tapping out Pin 2 of CRSC as "R." The connection of NMOS-based LDDE can be mapped on a complementary basis.

In one embodiment, the capacitor $C_p$ and resistor $R_p$ are assigned values of 26 nF and 700 kΩ, respectively. The frequency $f_p$ of the sinusoidal current source Ip was set at 85 Hz. As shown in FIG. 2, the size of $M_1$ is chosen according to the specified maximum current i.e. peak value of $I_p$. $M_2$ is sized to the minimum dimension to reduce power loss. $T_2$ is a set of parallel BJTs, the number of BJTs in the parallel connection is set to an optimum value. The higher the number of BJTs, the faster is the charging of $C_{gs}$ of $M_1$ and higher is the $V_{sg}$ of $M_1$, which leads to two opposing effects on the output power. First, the $M_1$ gets pulled deeper into the triode region, which reduces the LDDE forward conduction drop. This tends to increase the output power $P_o$, by increasing the extracted power $P_{extd}$. Secondly, for higher $V_{sg}$, the power spent in charging and discharging of $M_1$ increases, which tends to decrease $P_o$ by increasing the control power $P_c$.

$$P_o = P_{extd} - P_c \quad (3)$$

Figure 6:
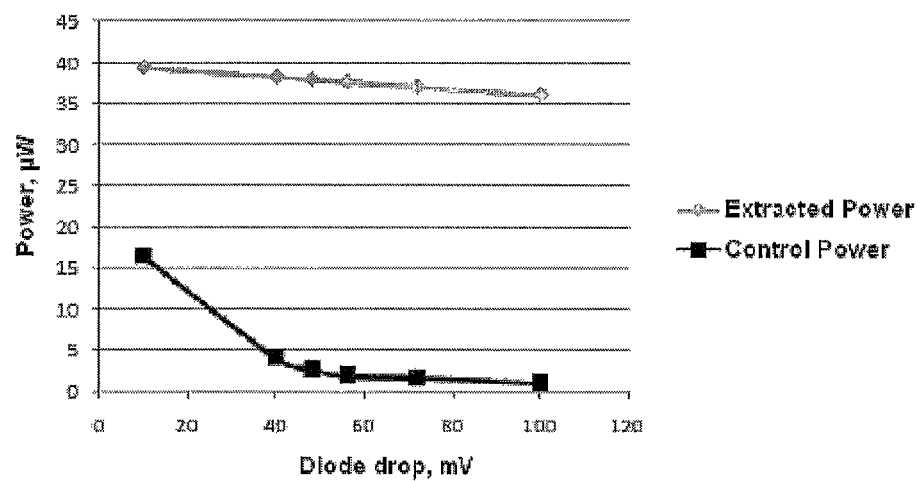
FIG. 6 illustrates variation of extracted power and control power with diode drop as a plot, in accordance with one embodiment.
Figure 7:
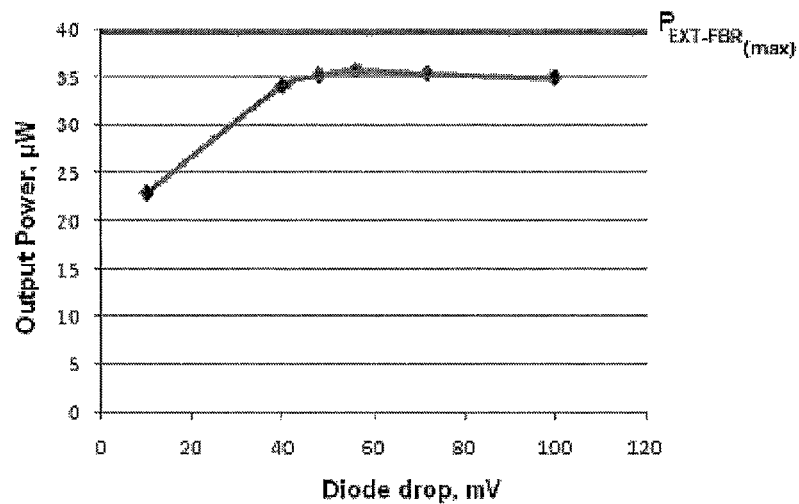
FIG. 7 illustrates variation of output power with diode drop as a plot, in accordance with one embodiment.

Thus, there is the need of an optimum number of parallel BJTs, so that $P_o$ is the maximum. Corresponding to the optimum number of BJTs, there exists an optimum diode drop. FIG. 6 shows the variation of extracted power and control power with diode drop, i.e. the increase in $P_{extd}$ and control power $P_c$ with the decrease in diode drop. FIG. 7 shows that the power $P_o$ maximizes at a diode drop of 56 mV. Also, $T_1$ is a set of parallel BJTs and the number of $T_1$s is based on the number of $T_2$s.

Figure 8:
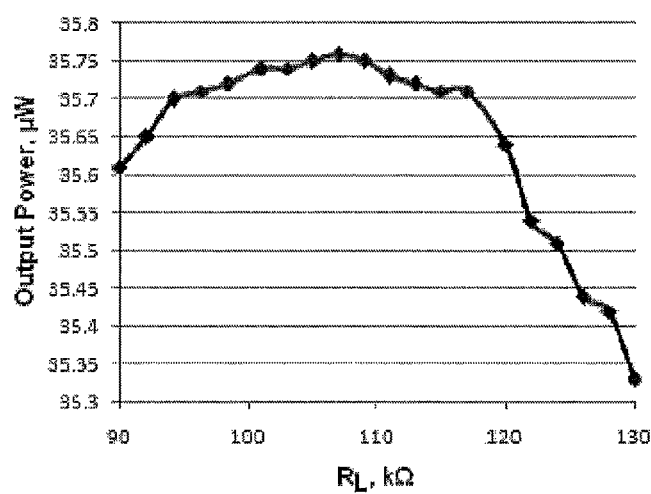
FIG. 8 illustrates variation of output power of LDDE based FBR with load resistance as a plot, in accordance with one embodiment.

The circuit is developed/simulated and tested at an amplitude of $I_p$ ($Ip_{peak}$) equal to 60 μA. The optimum value of load resistance $R_L$, corresponding to the maximum output power is determined by varying the resistor $R_L$ and finding the output power $P_o$. FIG. 8 illustrates a plot of $P_o$ versus $R_L$ or the variation of output power with load resistance. The optimum value $RL_{opt}$ was determined to be 107 kΩ.

The output power $P_o$ is calculated by measuring $V_o$ as $$P_o = V_o^2 / R_L \quad (4)$$

Figure 9:
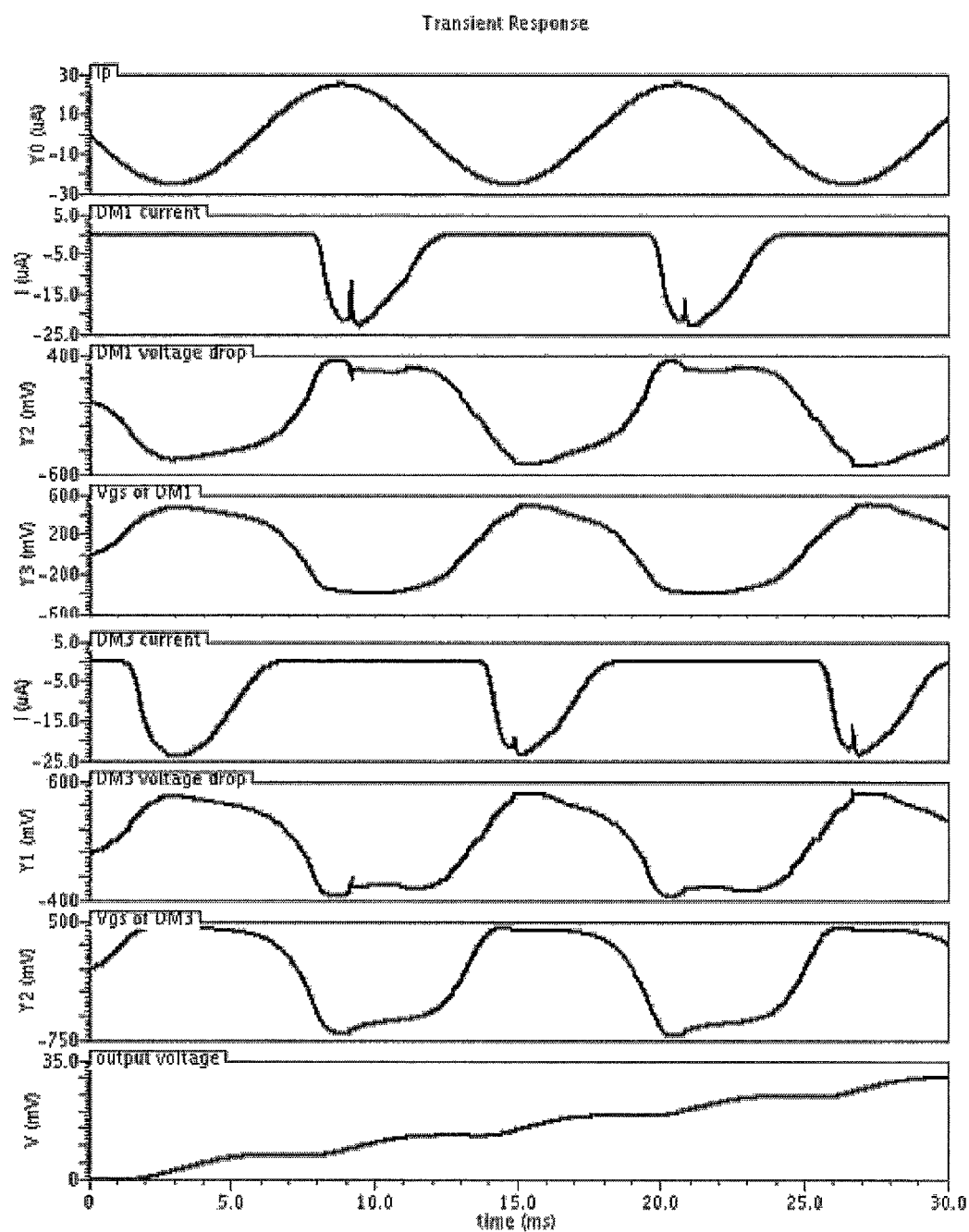
FIG. 9 shows start-up waveforms of LDDE based FBR at $Ip_{peak}$=25 µA and $f_p$=85 Hz.
Figure 10:
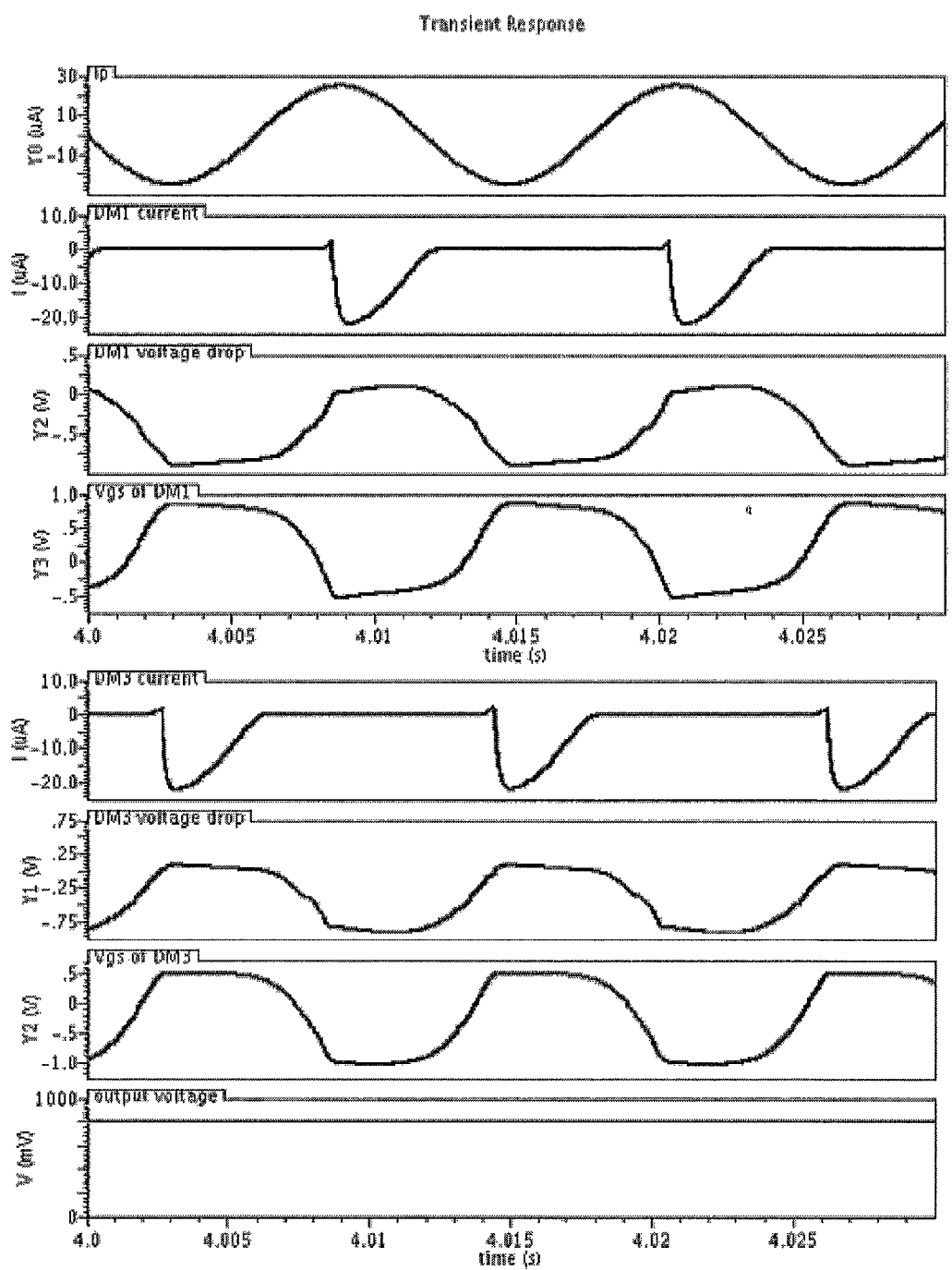
FIG. 10 shows steady-state waveforms of LDDE-based FBR at $Ip_{peak}$=25 µA and $f_p$=85 Hz.

The circuit is developed/simulated at various values of $Ip_{peak}$. The LDDE forward conduction drop $V_D$, LDDE current, gate control voltage of LDDE, and output voltage $V_o$ are plotted as shown in FIGS. 9 and 10. FIG. 9 illustrates start-up waveforms of LDDE based FBR at $Ip_{peak}$=25 μA and $f_p$=85 Hz. FIG. 10 illustrates steadystate waveforms of LDDE-based FBR at $Ip_{peak}$=25 μA and $f_p$=85 Hz. The output power is calculated in each case. From Table I, $PEXT_{(max)}$ of FBR, in the best case of $V_D$=0, is given by $$P_{EXT-FER(max)} = C_p \times V_p^2 \times f_p \quad (5)$$

The efficiency of output power extraction is calculated with respect to the maximum possible available power from PZD-FBR ($P_{EXT-FBR(max)}$). The efficiency of output power extraction is calculated by $$\eta = \frac{P_o}{P_{EXT-FBR(max)}} \quad (6)$$

In one embodiment, TABLE II as shown below shows the η values at various values of $Ip_{peak}$. The theoretical output power from a PZD-FBR at $V_D$=0 and for any load resistance $R_L$ is given below:

$$P_{EXT-FBR(R_L)} = \frac{I_{Ppeak}^2 \times (1 - \cos^2\theta)}{(2 \times \pi)^2 \times f_p \times C_p} \quad (7)$$

where $$R_L = \frac{(1 - \cos^2\theta)}{(1 + \cos\theta)^2 \times 4 \times f_p \times C_p}$$

and θ is the non-conduction angle in Ip half cycle.

TABLE II shows $P_o$ and η values of LDDE-based FBR at various values of $Ip_{peak}$

| $I_{Ppeak}$ (μA) | $V_p$ (V) | $P_{EXT-FBR(max)}$ (μW) | $P_o$ (μW) | η (%) |
|---|---|---|---|---|
| 20 | 1.413 | 4.41 | 3.71 | 84.13 |
| 30 | 2.122 | 9.95 | 8.83 | 88.74 |
| 40 | 2.828 | 17.67 | 15.55 | 88.00 |
| 50 | 3.535 | 27.62 | 24.38 | 88.27 |
| 60 | 4.241 | 39.75 | 35.76 | 90.0 |

Figure 11A:
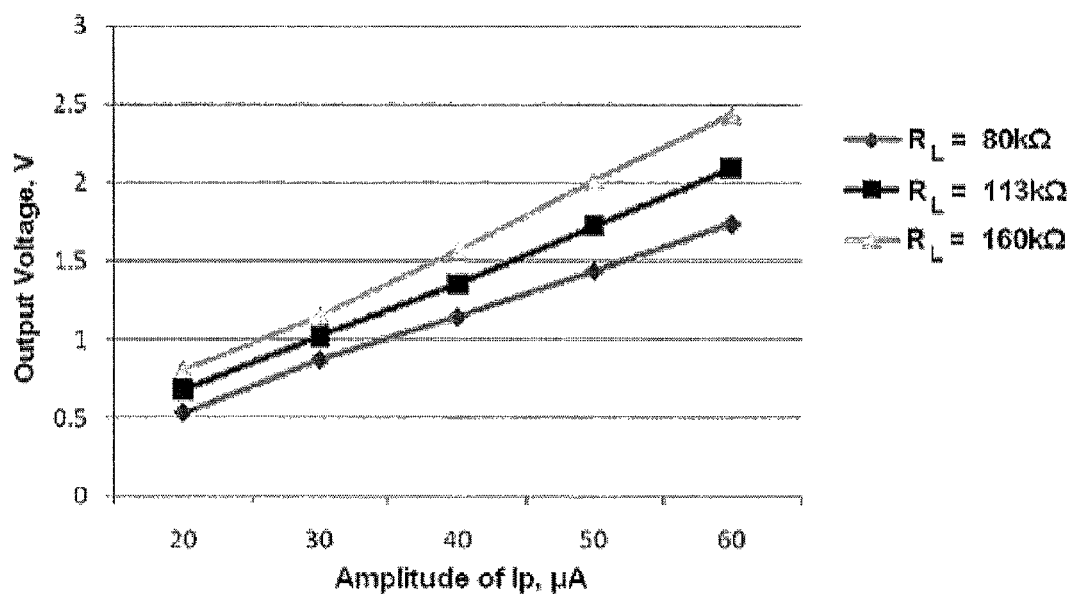
FIG. 11a illustrates an output voltage performance of LDDE based FBR as a function of $Ip_{peak}$ for various load resistors.
Figure 11B:
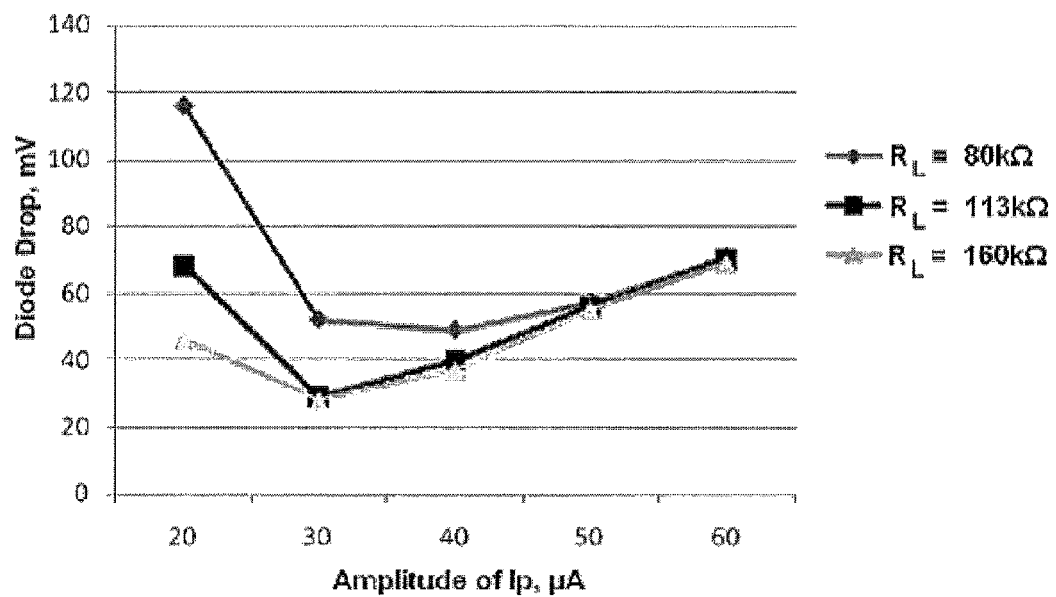
FIG. 11b shows diode drop performance of LDDE based FBR as a function of $Ip_{peak}$ for various load resistors.
Figure 11C:
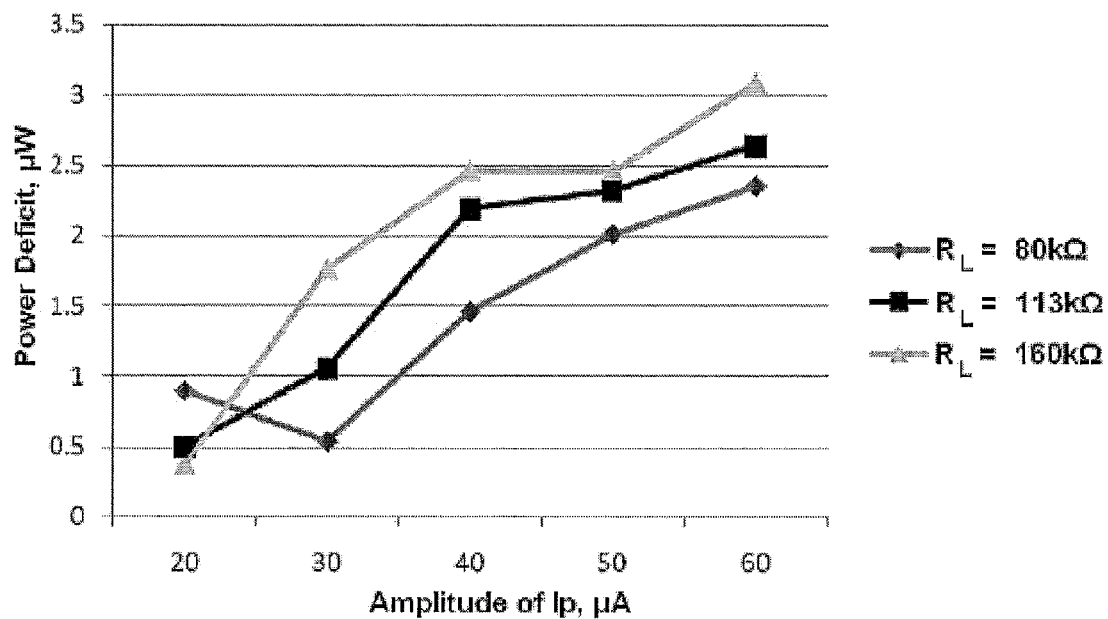
FIG. 11c shows power deficit performance of LDDE based FBR as a function of $Ip_{peak}$ for various load resistors.

The power depreciation at the output from the theoretically predicted values of output power for an ideal PZD-FBR is determined as a function of $Ip_{peak}$ for different values of $R_L$, $R_p$ is ignored. FIG. 11c illustrates a plot for power deficit. The characteristic of power deficit is explained using the output voltage $V_o$ and diode drop curves as shown in FIGS. 11a and 11b. Further, FIGS. 11a, 11b and 11c illustrate performance of LDDE based FBR for output voltage, diode drop and Power deficit respectively as a function of $Ip_{peak}$ for various load resistors $R_L$. The output voltage $V_o$ is a direct indicator of the $V_{gs}$ of $M_1$ as shown in FIG. 10, and hence, of the $CV^2f_p$ switching losses in the gate capacitance of $M_1$. The diode drop is a pointer to the conduction loss ($V_D \cdot I_{ds}$), where $I_{ds}$ is the source current of $M_1$ which may be approximated to $I_p$ during diode conduction.

In one embodiment, for low values of $V_o$, $M_1$ is not in the deep triode region, as shown by the diode drop curves. For $R_L=80$ kΩ, deep triode region is entered at a value of $Ip_{peak}$ of approximately 40 µA. For $R_L=113$ kΩ and 160 kΩ, deep triode region is already entered at $Ip_{peak}$ of 30 µA. When not in the deep triode region, conduction loss is the major loss. As $R_L$ increases for a fixed $Ip_{peak}$, $V_o$ increases, $V_{gs}$ increases, $V_D$ decreases, and hence, conduction loss decreases with the increase in $R_L$. The decrease in conduction loss is also due to the lesser conduction period as $R_L$ increases. Also, when not in the deep triode region, as $Ip_{peak}$ increases at a fixed $R_L$, Vo increases, $V_{gs}$ increases, $V_D$ decreases at a faster rate than $Ip_{peak}$ increases, and thus conduction loss decreases.

In one embodiment, when $M_1$ enters into the deep triode region, switching loss dominates. For a fixed $R_L$, as $Ip_{peak}$ increases, Vo increases, Vgs increases, and switching loss increases. The conduction loss also increases, as in the triode region, $V_{ds}$ increases with $I_{ds}$ (or $Ip_{peak}$). For a fixed $Ip_{peak}$, as $R_L$ increases, $V_{gs}$ increases leading to higher switching loss. The variation in $V_{ds}$ (or $V_D$) with $R_L$ is insignificant in the deep triode region. For comparison with the standard DCMOS, the FBR-filter section of PZD is wired with DCMOS and simulated. The DCMOSs used are of the same type and dimension, as $M_1$ of LDDE, to enable the best comparison. The optimum load resistor $RL_{opt}$ of DCMOS based FBR is found to be 111 kΩ.

Figure 12:
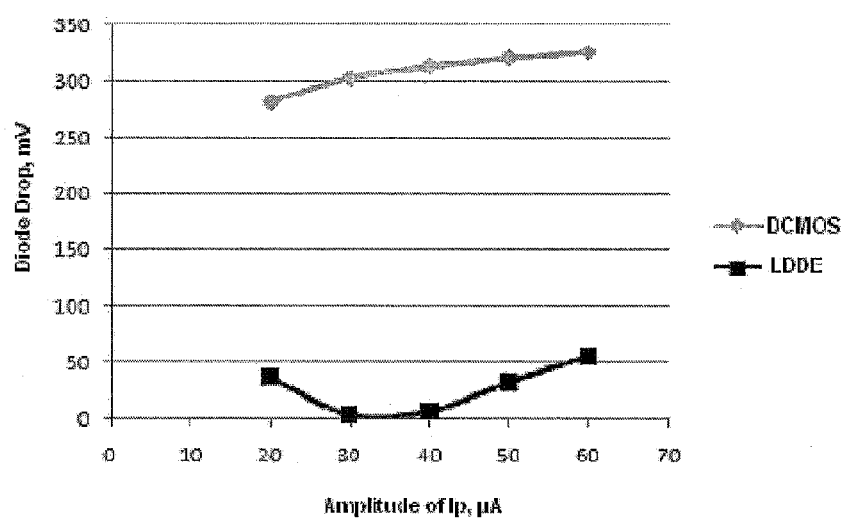
FIG. 12 illustrates comparison of diode drop of LDDE with that of Diode Connected MOSFET (DCMOS)
Figure 13:
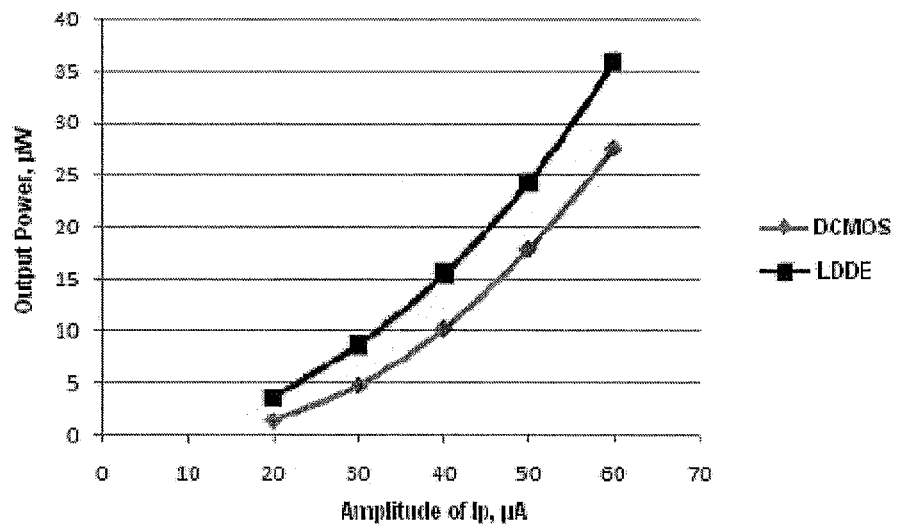
FIG. 13 illustrates comparison of output power of LDDE based FBR with that of DCMOS based FBR.

FIGS. 12 and 13 illustrate that the LDDE scores over DCMOS both in terms of lower $V_D$ and higher $P_o$. The $P_o$ is higher by up to 169% for low values of $Ip_{peak}$ and by up to 30% at higher values of $Ip_{peak}$. This trend is known from $P_{EXT(max)}$ of FBR, as shown in Table I.

In FIG. 12, it is noted that the LDDE forward conduction drop decreases with the increase in $Ip_{peak}$ for low values of $Ip_{peak}$ and starts increasing with $Ip_{peak}$ for higher values of $Ip_{peak}$. Referring to FIG. 2, it is observed that for low values of $V_p$, transistor $T_1$ is not sufficiently conducting to turn ON the transistor $T_2$ fully, which leads to lesser charging of $C_{gs}$ of $M_1$. So, $M_1$ cannot be pulled into the deep triode region. As a result, $V_{sd}$ of $M_1$ will be higher than when in the deep triode region. As $V_p$ increases, $T_1$ conducts better leading to a better $T_2$ conduction and better charging of $C_{gs}$. This leads to $M_1$ being pulled more into the triode region, reducing the $V_{sd}$ of $M_1$. But beyond the value of $V_p$ at which $M_1$ is pulled well into the triode region, $V_{sd}$ increases with $Ip_{peak}$ or $V_p$ as the source current of $M_1$ increases with $Ip_{peak}$.

The circuit is designed to maximize the output power from FBR filter section. The diode drop has been optimized to a value which gives the maximum output power. The diode drop can be reduced to even lower values with the same circuit by increasing the number of parallel BJTs for $T_2$. However, this may lead to higher power consumption with respect to charging and discharging of $M_1$. By setting aside the constraint of power loss, diode drop as low as 10 mV at 38 µA may be achieved, as shown in FIGS. 6 and 7. TABLE III provides the comparison of the LDDE based circuit with conventional or previous implementations of low drop diodes as shown below.

| Work | Power Efficiency (%) | Diode Drop (mV) | Requires external supply | FBR Implemented | Requires off-chip capacitor | Harvester Type |
|---|---|---|---|---|---|---|
| Reference [8] Passive full wave rectifier | 65$ | Not specified | No | No** | Yes | Vibration (PZD) |
| Reference [8] Synchronous full wave rectifier | 85$ | 350 | Yes | No** | No | Vibration (PZD) |
| Reference [27] | 36.6$ | Not specified | No | No*** | No | RF |
| Reference [28] | 88* | 25 | No | No** | No | Vibration (PZD) |
| Reference [13] | 65@ | Not specified | No | No@@ | No | Vibration (Electromagnetic) |
| Reference [14] | 72 | 75 | No | Yes | No | Wind |
| Reference [29] Passive Boot-Strap Rectifier | 65 | Not specified | No | Yes | No | Vibration (Electromagnetic) |
| Proposed | 90$$ | 56 | No | Yes | No | Vibration (PZD) |

$Maximum efficiency specified in the paper.
*Value at $f_p$ = 100 Hz, for better comparison with proposed work, which was simulated at $f_p$ = 85 Hz.
$$Worst case value, as efficiency of output power is calculated w.r.t. $P_{EXT\text{-}FBR(max)}$. Output Power was obtained by simulation.
**Implements voltage doubler.
***Implements full wave rectifier with asymmetrical stack architecture.
@Value at ≈100 µW output power for better comparison with proposed work.
@@Implements voltage multiplier.

The FBR implementation theoretically provides lesser power efficiency than voltage doubler for the same type of diode equivalent, because of two reasons. One, for a diode drop $V_D$, and under the same input conditions, the $P_{EXT(max)}$ of FBR is lesser than that of voltage doubler, as shown in Table I; and secondly, the total control power of the diode equivalents is more for FBR as there are four diodes, as against two in voltage doubler. The FBR implementation has been taken up because it is a generic rectifier, which is used in the more advanced rectifiers such as bias flip rectifier and switch only rectifier. Furthermore, the LDDE can be used in voltage doubler also.

In one embodiment for experimental verification, the FBR-filter section of the interface circuit for PZD-based vibration energy harvesting is rigged up using discrete components. Specified working of the proposed LDDE is verified by wiring it up using discrete components and using it in place of the four diodes in FBR. To enable comparison with the conventional DCMOS, the FBR-filter is configured, both using the proposed LDDE and conventional DCMOS. The DCMOS-based FBR is configured using the same type of MOSFET as used for LDDE-based FBR to enable the best comparison. The PZD used is Mide Volture V21BL, with $C_p$ of 26 nF. TABLE IV gives the list of components used in the experiment.

TABLE IV

| Device id | Component part number |
|---|---|
| $M_1$ of FIG. 2 and $M_2'$ of FIG. 3 | BS250 |
| $M_2$ of FIG. 2 and $M_1'$ of FIG. 3 | BS170 |
| $T_1$ of FIG. 2 and $T_2'$ of FIG. 3 | BC557 |
| $T_2$ of FIG. 2 and $T_1'$ of FIG. 3 | BC547 |
| $D_1$-$D_4$ | BZY88C5V1 |
| $C_s$ | 18 pF (ceramic) |
| $C_o$ | 10 µF (electrolytic) |

One embodiment of the present disclosure is determination of resonance frequency of PZD. The PZD was vibrated at various frequencies from 50 to 500 Hz at fixed amplitude of 1 g. The amplitude of sinusoidal output from PZD peaked at 85 Hz. The resonance frequency is 85 Hz.

One embodiment is determination of optimum load for the PZD-rectifier circuit. The PZD is vibrated at 85 Hz, 0.5 g, and the output voltage $V_o$ from the FBR filter was noted at various values of load resistance $R_L$. The output power $P_o$ in each case is calculated using equation (4). The output power peaks at a resistor value $R_L$ equal to 100 kΩ The optimum load resistance is found to be 100 kΩ. $R_L$ is kept fixed at its optimum value during the rest of the experiment.

Figure 14A:
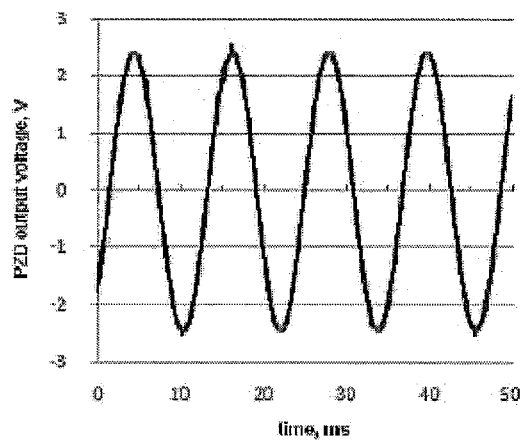
FIGS. 14a and 14b illustrate PZD output and FBR-filter output of LDDE based FBR at 0.8 g, 85 Hz vibration of PZD.
Figure 14B:
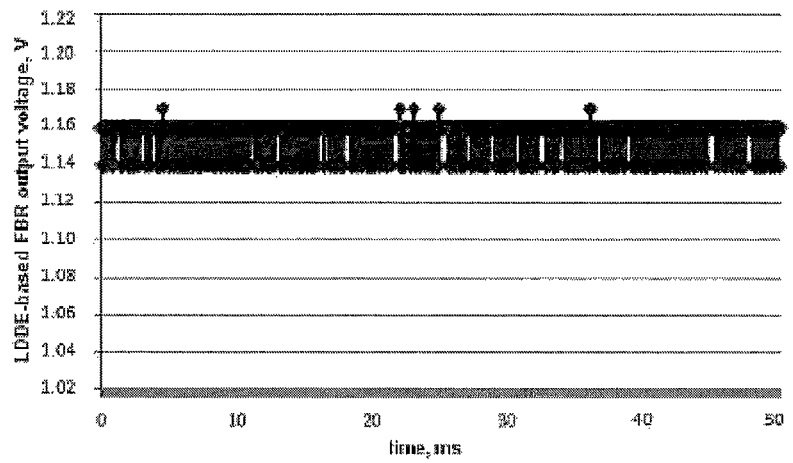
Figure 15:
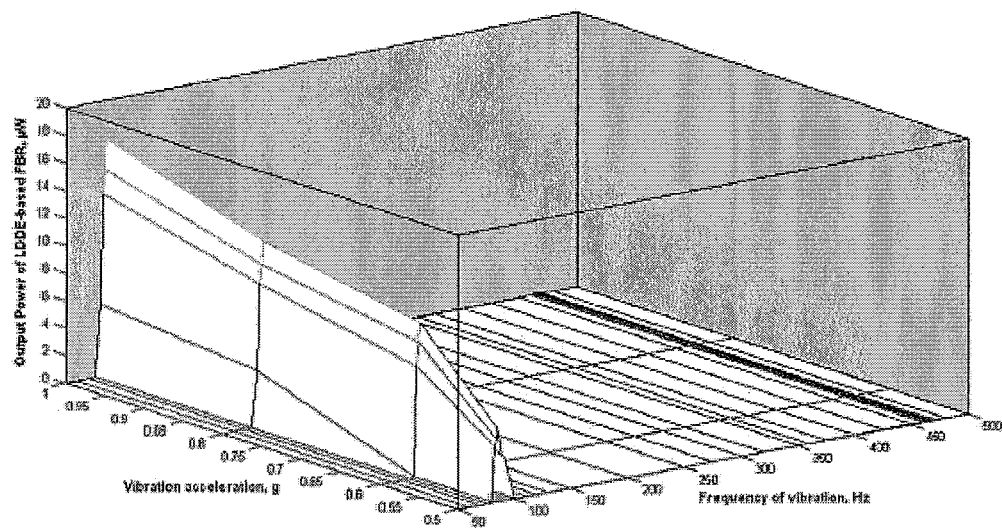
FIG. 15 shows output power of LDDE based FBR at different frequencies and amplitudes of vibration of PZD.

One embodiment is characterization of LDDE based FBR. The PZD is vibrated at various frequencies ranging from 50 to 500 Hz and amplitudes from 0.5 g to 1 g. The output voltage $V_o$ of LDDE based FBR is measured as shown in FIGS. 14a and 14b. The output power is calculated using equation 4. A 3-D plot of output power is made based on the obtained data as shown in FIG. 15.

One embodiment is comparison of performance of LDDE with that of DCMOS. The PZD is vibrated at various frequencies ranging from 81 to 89 Hz and amplitudes ranging from 0.3 g to 1 g. The rectified voltage at the optimally loaded output of FBR and the diode drop are measured in both the configurations, viz., LDDE based and conventional DCMOS based. The output power is calculated using equation 4.

Figure 16:
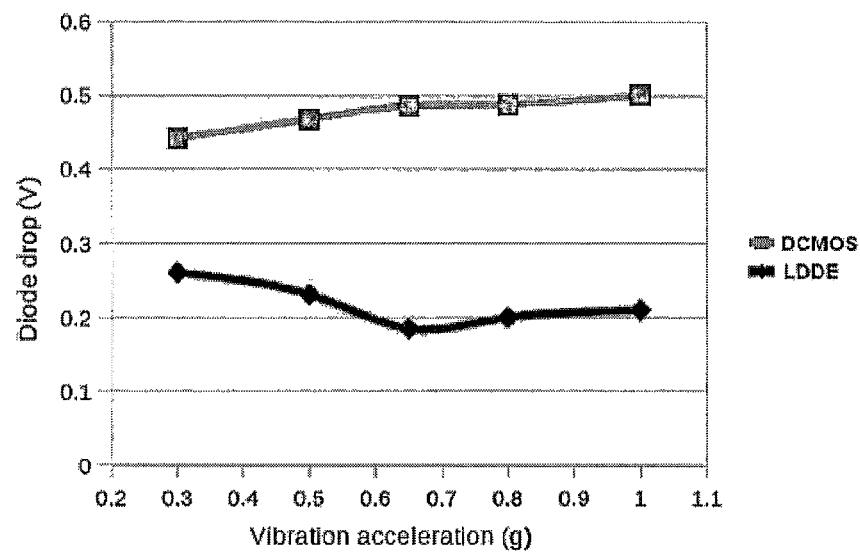
FIG. 16 illustrates comparison of forward conduction drop of LDDE with DCMOS at vibration frequency of 85 Hz.
Figure 17:
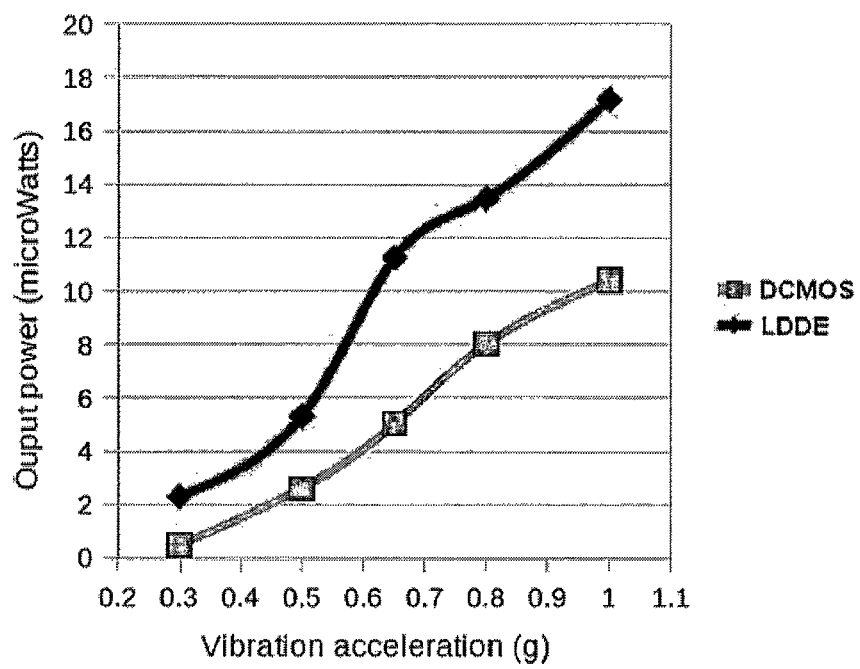
FIG. 17 illustrates comparison of output power from LDDE based FBR with that from DCMOS-based FBR at vibration frequency of 85 Hz.
Figure 18:
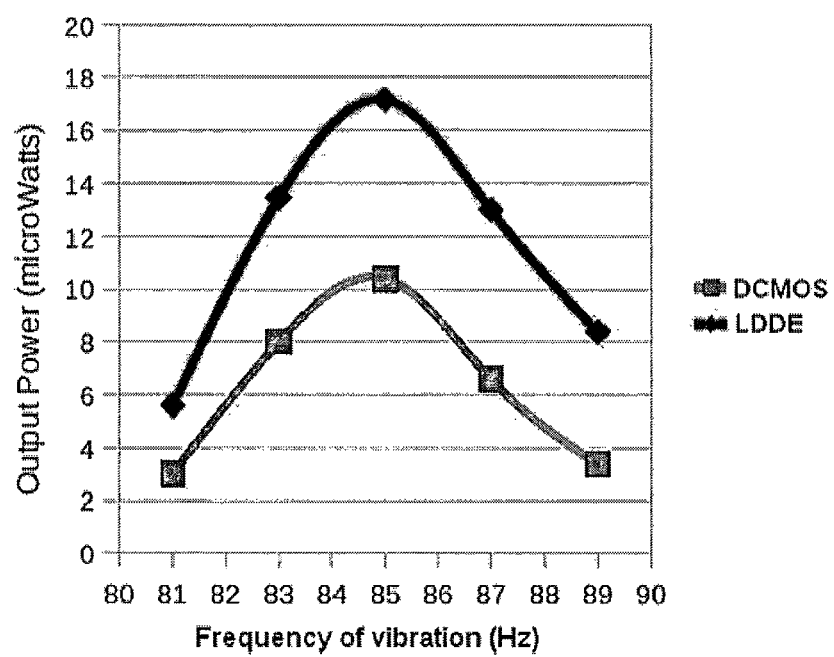
FIG. 18 illustrates comparison of output power from LDDE based FBR with that from DCMOS-based FBR at vibration acceleration=1 g.

FIGS. 16, 17 and 18 show the LDDE method has a strict advantage over conventional method in terms of lower diode drop and higher output power, under same input conditions. The LDDE based FBR provides a 65-104% increase in power as compared to the DCMOS based FBR.

In one embodiment, a linear region operated MOSFET based LDDE may be directly powered from input signal and requires no additional power supply. The diode equivalent i.e. LDDE is used to replace the four diodes of FBR in PZD interface circuit. The efficacy of the diode equivalent in decreasing the diode drop and increasing the output power from a PZD bridge rectifier circuit has been demonstrated through simulation in 130-nm technology and experiment with discrete components. It provides a 30-169% increase in output power as compared to a bridge rectifier with conventional diode-connected MOSFETs. The simulation in 130-nm technology also shows that it can extract 90% of the maximum available power from an ideal PZD-bridge rectifier circuit. Setting aside the constraint of power loss, simulations indicate that a diode drop as low as 10 mV at 38 µA can be achieved.

The LDDE of the present disclosure can replace the diodes in various architectures of rectifiers used for PZD-based harvesting. These architectures include but are not limited to conventional FBR, switch-only rectifier, bias-flip rectifier, series synchronized switching harvesting with inductor (SSHI), synchronous charge extraction circuit, voltage doubler, resonant rectifier, and pulsed-resonant micro-power converter.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:
1. A low drop diode equivalent circuit comprising:
an input is a first terminal of a switch metal oxide semiconductor field effect transistor (MOSFET) ($M_1$), a second terminal forming an output, a third terminal to provide a control input, said input is also being coupled to one terminal of a sense transistor ($T_1$), a second terminal of said sense transistor is coupled to the output, a third terminal of said sense transistor is connected to a control transistor ($T_2$) for providing control input to the switch MOSFET ($M_1$), a discharge MOSFET ($M_2$) is connected across the second terminal and the third terminal of the switch MOSFET ($M_1$), and a third terminal of discharge MOSFET ($M_2$) is connected to a source providing reverse signal (R) for switching OFF the diode equivalent.

2. The diode equivalent circuit as claimed in claim 1, wherein the switch MOSFET ($M_1$) is p-channel MOSFET, the discharge MOSFET ($M_2$) is n-channel MOSFET, the sense transistor ($T_1$) is p-n-p BJT and the control transistor ($T_2$) is an n-p-n BJT.

3. The diode equivalent circuit as claimed in claim 2, wherein the input is anode and the output is cathode of the diode equivalent circuit.

4. The diode equivalent circuit as claimed in claim 2, wherein the emitter terminal of the control transistor ($T_2$) is a control reference (C), an additional third terminal of the diode equivalent, which is to be connected to a point in the circuit which when the diode equivalent is conducting, would be at least one threshold voltage below the point to which anode of diode equivalent is connected.

5. The diode equivalent circuit as claimed in claim 2, wherein when the diode equivalent is forward biased, the emitter-base junction of the sense transistor ($T_1$) is operated in forward bias and the sense transistor ($T_1$) conducts and provides required current for making the control transistor conduct.

6. The diode equivalent circuit as claimed in claim 2, wherein the control transistor ($T_2$) conducts to charge the gate-source capacitance of the switch MOSFET ($M_1$).

7. The diode equivalent circuit as claimed in claim 2, wherein the switch MOSFET ($M_1$) conducts when source-gate voltage exceeds a predefined threshold voltage of $M_1$.

8. The diode equivalent circuit as claimed in claim 2, wherein the source-gate voltage keeps increasing and the switch MOSFET enters from saturation region to linear region of conduction, and said conduction in the linear region provides low voltage drop across the input and output of diode equivalent, which ranges in terms of tens of millivolts.

9. The diode equivalent circuit as claimed in claim 2, wherein when the switch MOSFET ($M_1$) is conducting in linear region, the voltage across emitter-base junction of the sense transistor ($T_1$) reduces, thereby turning OFF the sense transistor ($T_1$).

10. The diode equivalent circuit as claimed in claim 2, wherein the control transistor ($T_2$) is turned OFF when the sense transistor ($T_1$) is switched OFF.

11. The diode equivalent circuit as claimed in claim 2, wherein the switch MOSFET ($M_1$) continues to operate in linear region as gate-source capacitance of $M_1$ has no discharge path.

12. The diode equivalent circuit as claimed in claim 2, wherein reverse biasing of the diode equivalent generates a reverse signal (R) to turn ON the discharge MOSFET ($M_2$), thereby discharging drain-gate capacitance of switch MOSFET ($M_1$) and turning OFF $M_1$ to prevent reverse conduction of the diode equivalent circuit.

13. The diode equivalent circuit as claimed in claim 2, wherein the switch MOSFET is n-channel, the discharge MOSFET is p-channel, the sense transistor is n-p-n BJT and the control transistor is p-n-p BJT, and is the complementary counterpart to the diode equivalent circuit.

* * * * *